*E. G. Locke,*

*Box Scraper.*

No. 111,952.   Patented Feb. 21, 1871.

WITNESSES,   INVENTOR,

James N. Parsons

Stephen A. Cooke Jr.

Edward C. Locke

United States Patent Office.

EDWARD C. LOCKE, OF PROVIDENCE, RHODE ISLAND.

Letters Patent No. 111,952, dated February 21, 1871.

IMPROVEMENT IN METHODS OF ATTACHING HANDLES TO SCRAPERS.

*The Schedule referred to in these Letters Patent and making part of the same.*

I, EDWARD C. LOCKE, of the city and county of Providence, State of Rhode Island, have invented certain Improvements in Scrapers, of which the following is a specification.

The first part of my invention relates to so firmly fastening the plate of the scraper to the rest of the parts constituting the scraper that it will not become loosened so easily as in scrapers now generally used.

The second part of my invention relates to the combination of the plate of the scraper with the other parts in such a manner that it will be held firmly in its place when in a position for using, and also that it may be turned upon an axis so as to enable it to be ground without the difficulty now experienced.

Figure 1:
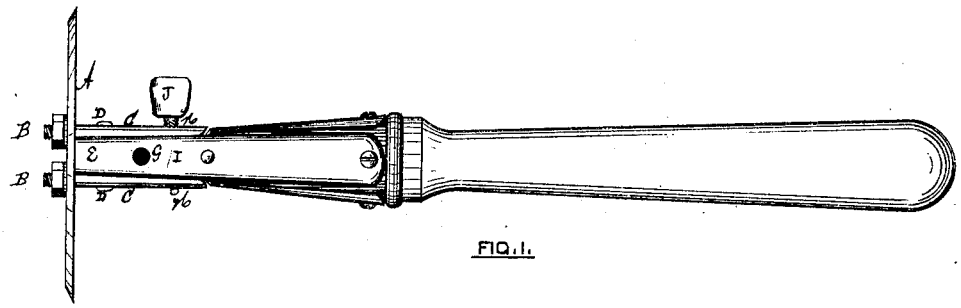
Figure 1 is a view with the scraper arranged for scraping.
Figure 2:
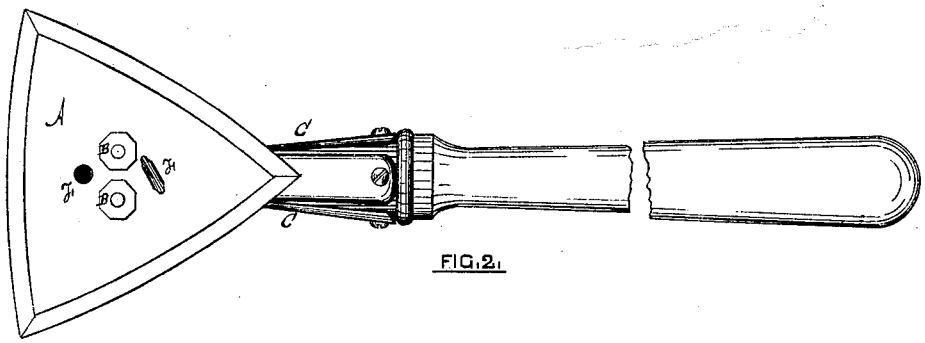
Figure 2 is a view with the scraper arranged for sharpening.
Figure 3:
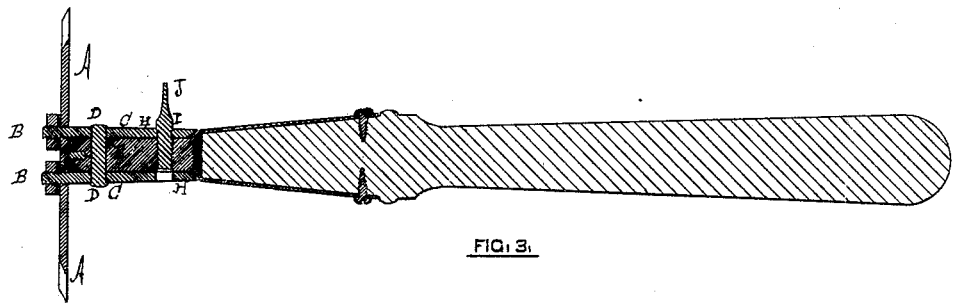
Figure 3 is a longitudinal section of the scraper.

A represents the plate.

B B, the two nuts, holding plate A firmly by means of the two jaws or arms C C extending backward from the plate A.

C C represent the two jaws or arms on which the plate A rests.

D represents the hinge on which the arms or jaws C C turn, the hinge passing through the upper end of the tongue E.

E is the tongue.

F F are the two holes in the plate A, either of which, in conjunction with the hole G, is used to firmly secure the plate A in its place by means of a thumb-screw or screws when in position for grinding.

G is the hole in the tongue in conjunction with F F in the plate A, by means of which the plate A is held firmly in position with the screw when fastened for the purpose of grinding.

H H represent the holes at the lower extremity of the jaws or arms C C, through which, in conjunction with the hole I, the screw passes, holding the arms or jaws C C firmly in their place when the scraper is in position for using.

I is the hole in the lower part of the tongue E, and is used, in conjunction with the holes H H in the lower part of the jaws C C, a screw passing through H H and I, holding the jaws C C firmly in position.

J is the detachable screw, used in conjunction with either of the holes F F and G or H H and I.

The particular differences and advantages of this scraper over those in ordinary use are these:

In the ordinary scraper the plate is secured to the handle by only one bolt, and cannot move from its fixed position for the purpose of grinding. In this improved scraper the plate is firmly secured by two bolts to the arms or jaws C C, so that when these jaws are secured to the tongue E by a screw the plate is firm, and does not become loosened so easily as by the ordinary method of securing it.

In the ordinary scraper there is considerable difficulty in grinding it. As it is stationary it is almost impossible to sharpen it uniformly. By the improvement here made the plate turns upon a hinge on both sides of the tongue, so that the edges may be easily placed upon the grindstone and sharpened equally on all sides. By this means every side may be rendered serviceable.

The advantages of this improvement are obvious at a glance.

What I claim, and desire to secure by Letters Patent, is—

The combination of a perforated scraper-plate, A, a pair of arms, C C, securely fastened to the same, the arms moving in different directions on a hinge, D, which is attached to each of said arms C C, a hinge, D, passing through the head of a tongue, E, the tongue E with perforations to correspond with those of the scraper-plate A, and used in conjunction with them, and a thumb-screw, J, or its equivalent, substantially as described and for the purposes set forth.

EDWARD C. LOCKE.

Witnesses:
JAMES H. PARSONS,
STEPHEN A. COOKE, Jr.